(12) United States Patent
Barnard et al.

(10) Patent No.: US 6,219,162 B1
(45) Date of Patent: Apr. 17, 2001

(54) METHODS FOR EQUALIZING WDM SYSTEMS

(75) Inventors: Chris Wilhelm Barnard, Orleans; Chung Yu Wu, Kanata, both of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/559,562

(22) Filed: Apr. 27, 2000

Related U.S. Application Data

(62) Division of application No. 08/997,822, filed on Dec. 24, 1997.

(51) Int. Cl.$^7$ ............................................. H04J 14/02
(52) U.S. Cl. ........................ 359/124; 359/110; 359/133; 359/161; 359/173
(58) Field of Search ............................. 359/124, 110, 359/133, 161, 173

(56) References Cited

U.S. PATENT DOCUMENTS

| | | | |
|---|---|---|---|
| 4,927,266 | * | 5/1990 | Sugiura et al. ........................ 356/243 |
| 5,225,922 | * | 7/1993 | Chraplyvy et al. .................. 359/124 |
| 5,383,210 | * | 1/1995 | Ichikawa ................................ 372/38 |
| 5,790,289 | * | 8/1998 | Taga et al. ............................. 359/124 |
| 6,008,916 | * | 12/1999 | Khaleghi ................................ 359/110 |
| 6,013,647 | * | 2/2000 | Roberts .................................. 359/161 |
| 6,040,933 | * | 3/2000 | Khaleghi et al. ...................... 359/124 |
| 6,069,718 | * | 5/2000 | Khaleghi ................................ 359/110 |
| 6,115,157 | * | 5/2000 | Barnard et al. ........................ 359/124 |

* cited by examiner

*Primary Examiner*—Leslie Pascal
*Assistant Examiner*—Hanh Phan
(74) *Attorney, Agent, or Firm*—Aprilia U. Diaconescu

(57) ABSTRACT

A method of equalizing the channels of a WDM link comprises identifying an error threshold level $BER_{Fail}$ for the BER defined for each signal $S(j)$ in accordance with the channel rate, and determining the attenuation $A(j)$ of, for example, the power $P(j)$ of each signal $S(j)$ transmitted over the WDM link. The transmitter powers are adjusted taking into account the attenuations determined for all channels. The attenuation $A(j)$ for channel $(j)$ is determined by first setting the power $P(j)$ of all signals $S(j)$ to a maximum $P_{Max}$, attenuating the power $P(j)$ of channel $(j)$ until the BER reaches the threshold value $BER_{Fail}$, measuring the power corresponding to the $BER_{Fail}$ for that channel, and calculating the difference between the $P_{Max}$ and $P(j)_{Fail}$. The transmitter powers are then set according to the relationship $P(j)=P_{Max}-\eta(A(j)-A_{Min})$, where $\eta$ is 0.8 for a system with 3–4 channels. The method may be used for multi-channel systems with intermediate nodes where channels are added and dropped.

5 Claims, 9 Drawing Sheets

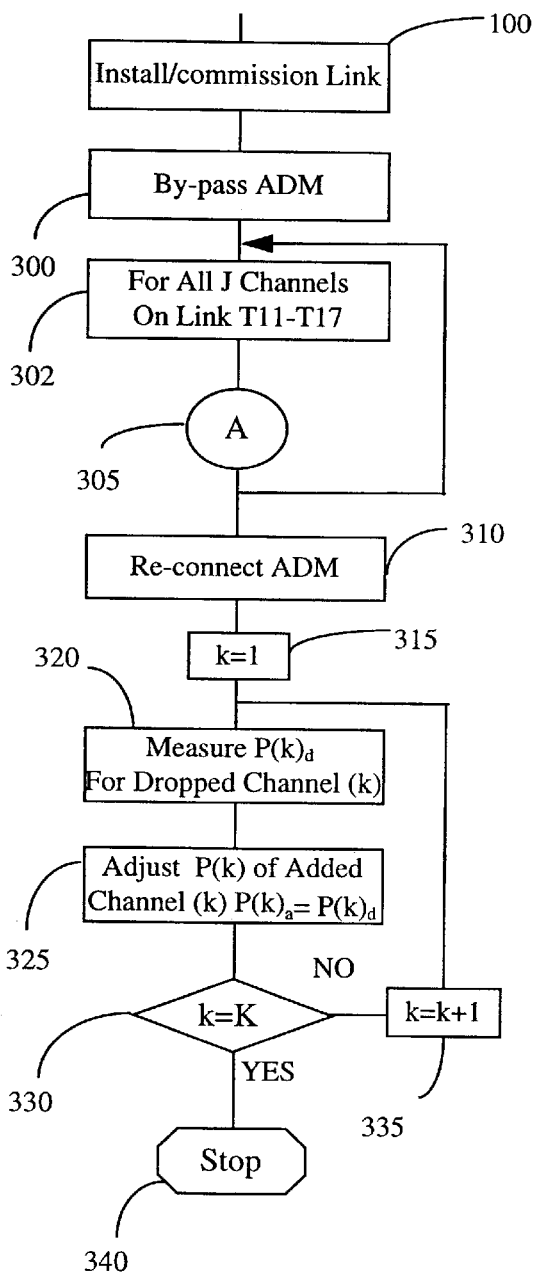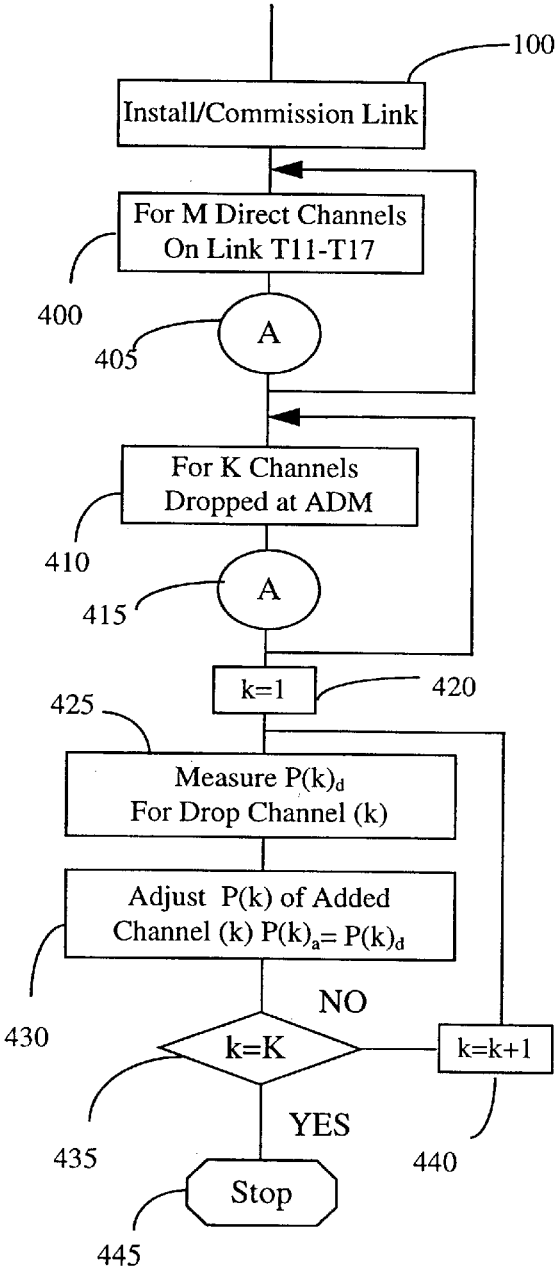

METHODS FOR EQUALIZING WDM SYSTEMS

This is a divisional application of U.S. Ser. No. 08/997,822 filed Dec. 24, 1997.

BACKGROUND OF THE INVENTION

1. Field of the Invention

The invention is directed to multi-channel communication systems and in particular to methods for equalizing WDM systems.

2. Background Art

High capacity optical transmission networks, such as those defined by the SONET/SDH standards, can use wavelength-division multiplexing (WDM) to increase the information carrying capacity of the optical fiber. In optical WDM systems, a plurality of optical signals, each at a different wavelength, are transmitted over a single optical fiber. The transmitter terminal consists of a like plurality of optical transmitters, typically semiconductor lasers, and an optical wavelength multiplexer, which combines all optical signals into a multi-channel signal before it is launched over the optical fiber. Each transmitter operates at a different wavelengths and is modulated with a different data signal, either by directly modulating the laser or by external optical modulation.

At the receiver terminal, an optical wavelength demultiplexer separates the light received over the fiber according to the wavelength. The signal transmitted on each wavelength is then detected by a respective optical receiver.

The WDM system reach, or the distance between the transmitter and receiver sites, is limited by the attenuation or dispersion of the signal along the optical fiber. The reach can be increased by placing optical amplifiers at intermediate points between the terminals. Examples of optical amplifiers are semiconductor optical amplifiers, and rare earth doped fiber amplifiers. Optical amplifiers simultaneously amplify all optical signals passing through it, i.e. the multi-channel signal, by amplifying the optical power by a gain.

Unfortunately, optical amplifiers exhibit a wavelength-dependent gain profile, noise profile, and saturation characteristics. Hence, each optical signal experiences a different gain along the transmission path. The amplifiers also add noise to the signal, typically in the form of amplified spontaneous emission (ASE), so that the optical signal-to-noise ratio (OSNR) decreases at each amplifier site. The OSNR is defined as the ratio of the signal power to the noise power in a reference optical bandwidth.

Furthermore, the optical signals in the co-propagating channels have different initial waveform distortions and undergo different additional distortions during propagation along the fiber. As a result, the signals have different power levels, OSNRs, and degrees of distortion when they arrive at the respective receivers, if they had equal power levels at the corresponding transmitters.

WDM networks, and particularly SONET/SDH WDM networks, are widely spread and the custom demand for these networks is growing fast. They provide faster bit rates, and are more flexible in terms of the bandwidth per channel and complexity than the previous single-channel systems. Network providers are looking for features such as user-friendly installation, operation and maintenance, and thus, an equalization procedure that is simple and reliable will greatly simplify the set-up and hence reduce the maintenance costs of the communication system.

It has been shown that the OSNRs at the output of an amplified WDM system can be equalized by adjusting the input optical power for all channels. For example, U.S. Pat. No. 5,225,922 (Chraplyvy et al.), issued on Jul. 6, 1993 to AT&T Bell Laboratories, provides for measuring the output OSNRs directly and then iteratively adjusting the input powers to achieve equal OSNRs.

FIG. 1 shows a block diagram of a four-channel unidirectional wavelength division multiplexed (WDM) transmission link deployed between terminals 11 and 17, using OSNR equalization according to the above identified patent. There are four unidirectional channels $\lambda(1)$–$\lambda(4)$ illustrated on FIG. 1, carrying traffic in the direction West-to-East. A short discussion of this method follows for a better understanding of the present invention. Terminal 11 comprises transmitters $T_1$ to $T_4$ and terminal 17 comprises receivers $R_1$ to $R_4$, connected over optical amplifiers 10, 20, 30, 40 and 50 and fiber spans 10', 20', 30' and 40'. The optical amplifiers are arranged at a suitable distance from each other, typically 100 km, to compensate for the attenuation of the signal with the distance. An optical amplifier amplifies all four signals, as it is well known.

The lasers of the transmitters $T_1$ to $T_4$ are modulated with signals $D_1$ to $D_4$, respectively, to produce optical signals $S_1$ to $S_4$. A multiplexer 13 at the site of terminal 11, combines optical signals $S_1$–$S_4$ into a multi-channel signal S, which is amplified in post-amplifier 10 before being launched over the transmission link. At reception, the multi-channel signal is amplified by pre-amplifier 50 and separated thereafter into signals $S'_1$–$S'_4$ with demultiplexer 15. Each receiver at terminal 17 converts the respective optical signal into an output electrical signal $D'_1$–$D'_4$, corresponding to input signals $D_1$ to $D_4$.

The U.S. Pat. No. 5,225,922 teaches establishing a telemetry link between two terminals 11 and 17 of a transmission network, for providing the measurements obtained at one terminal to the other. The patent indicates that the telemetry link may be provided with a control unit 5 (a microprocessor) that receives the measured input powers of signals $S_1$ to $S_4$ and the total output power or OSNR of multi-channel signal S, and adjusts the input power accordingly. This method also takes into account the known relative values of the gain for each channel. However, the method disclosed in the above patent has three disadvantages: (1) it equalizes OSNR, which is only one parameter of several that affect the performance of an optical transmission system, (2) measuring the OSNR requires additional equipment, such as an optical spectrum analyzer, outside of the SONET/SDH standards, and (3) it cannot be used to equalize systems where channels with different wavelengths carry traffic with different bit rates, since in such cases each channel has different OSNR requirements.

FIG. 1B shows the optical spectrum of a 4-channel WDM system, showing how the power of the channels varies with the wavelength.

As indicated above, in a typical WDM system the co-propagating channels do not have the same performance in terms of bit error rate (BER), because of different component losses, different transmitter and receiver characteristics, different path distortions, and also because the gain and noise of optical amplifiers in the system are channel-dependent. The BER is the ratio between the number of erroneous bits counted at a site of interest over the total number of bits received.

There is a need for providing a method for equalizing WDM systems that is more accurate and easier to implement than the current methods.

SUMMARY OF THE INVENTION

It is a primary object of the invention to provide a method for equalizing the BER performance of a WDM system, that alleviates totally or in part the drawbacks of the prior art methods.

It is another object of this invention to provide a method for equalizing a multi-channel communication system based on monitoring the BER values for all co-propagating channels.

It is still another object of the invention to provide a method for equalizing a WDM system that corrects the performance differences of the network elements without special instrumentation nor physical access to remote terminal sites.

Still another object of the invention is to determine the margins to the failure point of all channels, regardless of their bit rates, which is an important parameter for the customer when deploying the network.

Accordingly, there is provided a method for equalizing the performance of (J) transmission channels of a WDM link connecting a first terminal and a second terminal, comprising the steps of, (a) identifying an error threshold level $E(j)_{Fail}$ of an error count indicator $E(j)$ for a signal $S(j)$, the $E(j)$ characterizing the distortion of the signal $S(j)$ between the first and the second terminal, (b) determining an attenuation $A(j)$ of a parameter of interest $P(j)$ of the signal $S(j)$ between the first and the second terminal, (c) repeating steps (a) to (b) for all the J channels of the WDM system, (d) at the first terminal, adjusting the parameter $P(j)$ according to all the attenuations $A(j)$, and (e) repeating step (d) for all the signals $S(j)$ for obtaining substantially equal values of the parameter for all the J signals at the second terminal.

Further, there is provided a method for equalizing a plurality of (J) signals $S(j)$, travelling on a WDM link between a first terminal and a second terminal comprising the steps of, for each channel $\lambda(j)$ of the WDM link, measuring a distance to failure $A(j)$ for a parameter $P(j)$ of a signal $S(j)$ travelling on the channel $\lambda(j)$, and adjusting the parameter $P(j)$ at the first terminal for obtaining equal distances to failure for all J channels.

Advantageously, equalizing the BER value for all channels is preferable to equalization of any other parameter such as OSNR, in that the BER value accounts for all factors that affect the signal in both its electrical and optical states. The BER is the ratio between the number of erroneous bits counted at a site of interest over the total number of bits received, giving a measure of all errors introduced into a signal along an entire transmitter-receiver link.

Furthermore, some systems (for example SONET/SDH) are specified in terms of the BER and therefore the BER value is available at reception.

The method according to the invention performs field equalization to optimize a system in the field, and therefore a higher system margin is used than for equalization based on the average system parameters.

In addition, the method of the present invention does not require necessarily simultaneous access to both the transmitter and receiver ends, but requires physical access to both, one or none of the terminal sites. The method could be automated by a software interfacing between the terminals. Requiring simultaneous access to both terminal sites is disadvantageous, because it requires at least two persons communicating over long distances.

As indicated above, OSNR alone does not accurately characterize the system performance. The degradation of a signal is, on the other hand, fully expressed by the BER (bit error rate), which by definition accounts for all above listed signal degradation factors.

Furthermore, SONET/SDH systems are typically guaranteed in terms of a minimum BER requirement at the system end of life (EOL) and as such the BER measurement is generally available at any receiver site. To guarantee the EOL performance, there must be enough margin built in the system at the start of life (SOL), since many of the system parameters change in time or with environmental changes.

BRIEF DESCRIPTION OF THE DRAWINGS

The foregoing and other objects, features and advantages of the invention will be apparent from the following more particular description of the preferred embodiments, as illustrated in the appended drawings, where:

FIGS. 8A, 8B and 8C are flow-charts showing methods for equalizing a multi-channel WDM system with multiple terminal sites.

DESCRIPTION OF THE PREFERRED EMBODIMENT

The present invention provides a method for equalization of a transmission link in terms of BER, which is a more accurate and easier solution than what prior art provides. Also, this invention provides for measurement of an optimum margin to failure for all the channels at the system SOL.

The invention is applicable to networks equipped with performance monitoring capabilities. More precisely, the method of the invention is applicable to modern WDM transmission systems, which are in general provided with means for measuring the system BER at various network elements of interest.

The invention is described next using examples of SONET/SDH WDM transmission systems, but it is to be understood that it may also be applied to other technologies. The BER of a SONET/SDH system can be measured using the standard feature of this systems called the performance monitor (PM). In the following, a block diagram of a typical receiver and a typical transmitter for the transmission systems to which this invention pertains are provided for a better understanding of the invention.

Figure 1A:
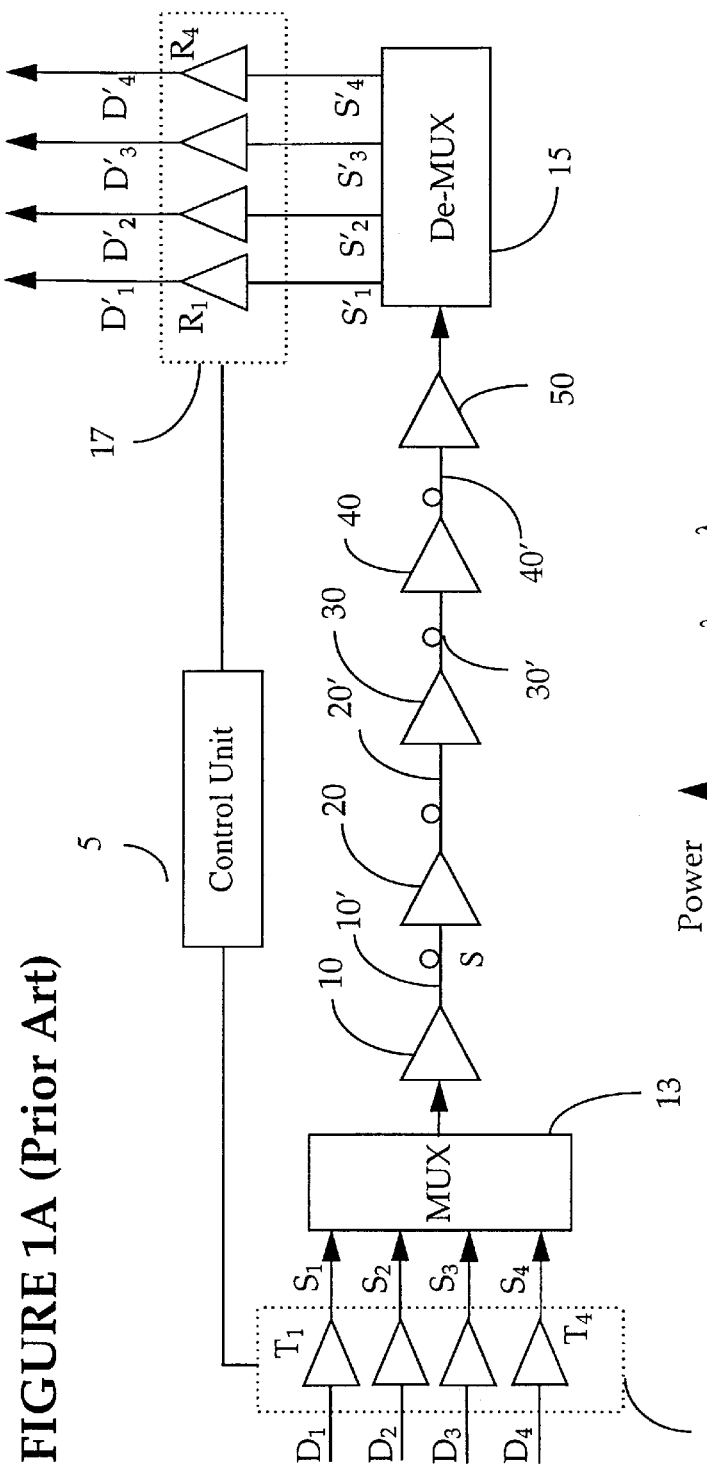
FIG. 1A is a block diagram showing a four-channel amplified WDM system.
Figure 1B:
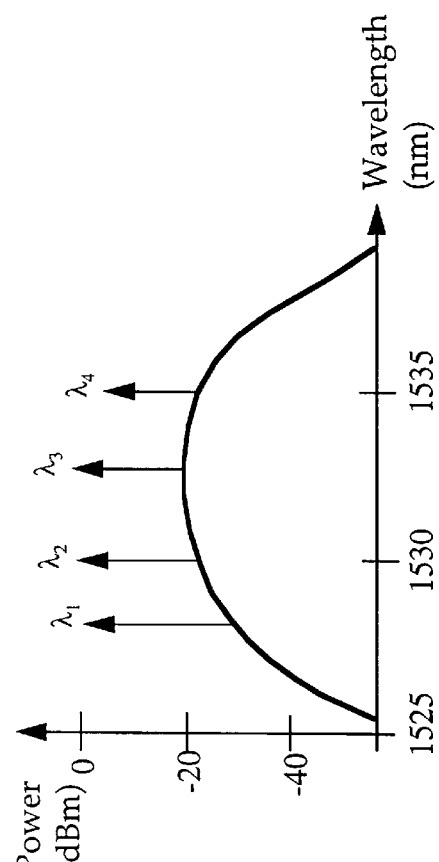
FIG. 1B shows an example of the optical spectrum of the WDM system.
Figure 2A:
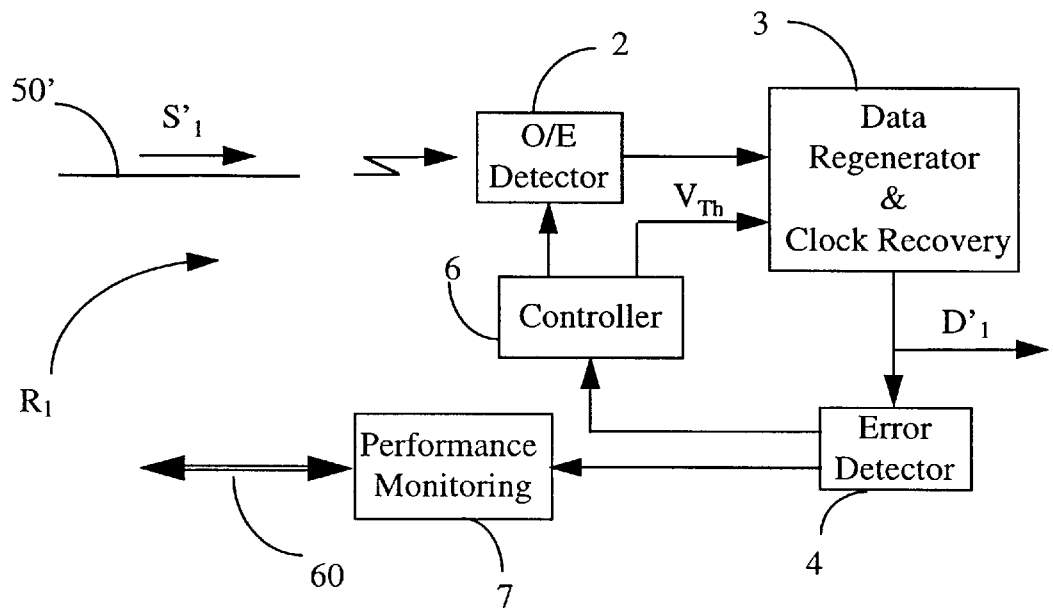
FIG. 2A is a block diagram of an optical receiver provided with performance monitoring.

A block diagram of a typical receiver is shown in FIG. 2A. An optical receiver generally comprises an optical-toelectrical converter 2, that could be an avalanche photodiode (APD), or a high performance PIN photodiode. A data regenerator and clock recovery block 3 extracts the information from the converted signal, based on a threshold level $V_{Th}$. The threshold is selected such as to provide the best error rate for a predetermined signal power level. For example, the levels over $V_{Th}$ are interpreted by the receiver as logic "1"s, while those under, as logic "0"s. The errors in regenerated data $D_1$', namely the BER value, are counted using an error detector 4.

It is known to generate a control code at the transmission site which is then transmitted with the information along the communication link. Error detection is based in general on comparison between the transmitted and the received control code.

For example, the error detection in SONET/SDH determines the BER of the respective signal based on the information in the B1 and B2 fields of the transport overhead of the SONET/SDH frame, as well as field B3 of the path overhead for the respective section, line and path.

The threshold level $V_{Th}$ applied to data regenerator 3 may be adjusted with a controller 6, so as to obtain BER values under a provisioned value of the respective system. The error count and control data are input to a performance monitor 7, connected to some or all remote elements of the network over a bus 60.

As the requirement for essentially error free operation for fiber systems became more stringent, sophisticated performance monitors are provided at the receiver site, which perform optimization routines for lowering the BER of the recovered signal.

Figure 2B:
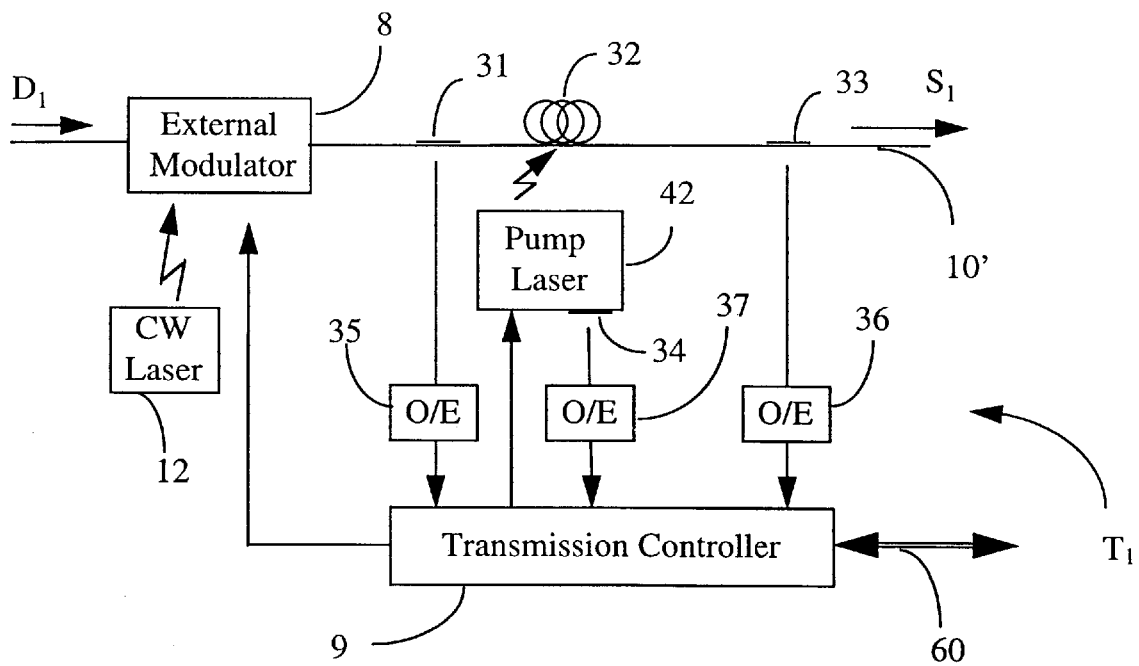
FIG. 2B is a block diagram of an optical transmitter.

Current transmitters are also able to monitor performance, as shown in the block diagram of FIG. 2B. A transmitter, e.g. $T_1$ comprises a CW (continuous wave) laser 12, which is fed into the external modulator 8 and is modulated with e.g. a signal $D_1$, to provide the optical signal $S_1$. Before transmission, this signal is amplified in an EDFA (erbium doped fiber amplifier) 32, which is provided with a pump laser 42 of a controlled power and wavelength. The input, output and backplane power of laser 42 are measured by diverting a fraction (approximately 3%) of the optical signal with taps 31, 33, and 34, respectively, and converting the respective fraction into a corresponding electrical signal with O/E converters 35, 36 and 37. The measurements are processed by a transmission controller 9, which in turn adjusts the pump laser 42 and the external modulator 8, and communicates with the performance monitor 7 and other remote elements of the network over bus 60.

In this way, the SONET/SDH performance monitor allows the user to remotely measure the channel performance anywhere in the network.

The equalization of the channels according to the invention is based on equalizing the BER values measured in a point of interest of the transmission link, so that it accounts for all factors affecting the system performance. Since bit errors occur at random times, a minimum number of errors, e.g. 10, is required to estimate the BER for a respective transmission channel within an acceptable confidence level. For example, if the testing interval is chosen to be 1 minute and the bit rate is 2.5 Gb/s, then 15 errors/minute corresponds to a BER of $10^{-10}$. In general, the network owner prepares BER-Power curves for all channels at installation, so that these curves are also available for equalization purposes.

To accelerate the procedure, equalization is preferably done at a high BER. Since it is difficult to adjust the system parameters to obtain an exact value for the BER, the failure rate is defined within an order of magnitude for the BER. For example, the point of failure for a channel is defined herein when between 2 and 150 errors are counted in a minute, which corresponds to a BER range from $1.33 \times 10^{-11}$ to $10^{-9}$ for a 2.5 Gb/s system. It is to be noted that the definition of failure point for the equalization procedure is different from the guaranteed minimum BER requirement of the system in operation.

Figure 3:
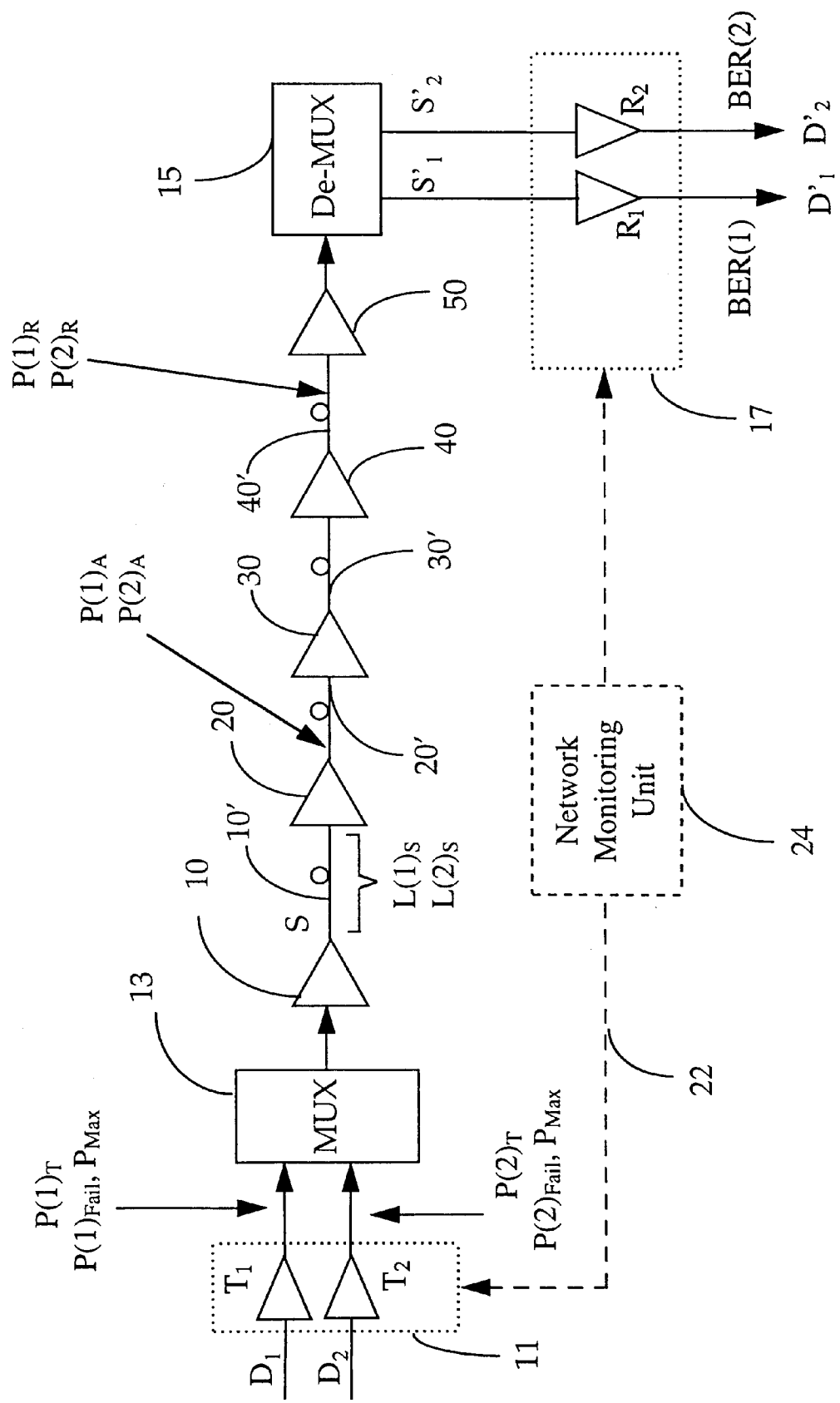
FIG. 3 is a block diagram of an amplified two-channel system for equalization of the received power according to the invention.
Figure 4:
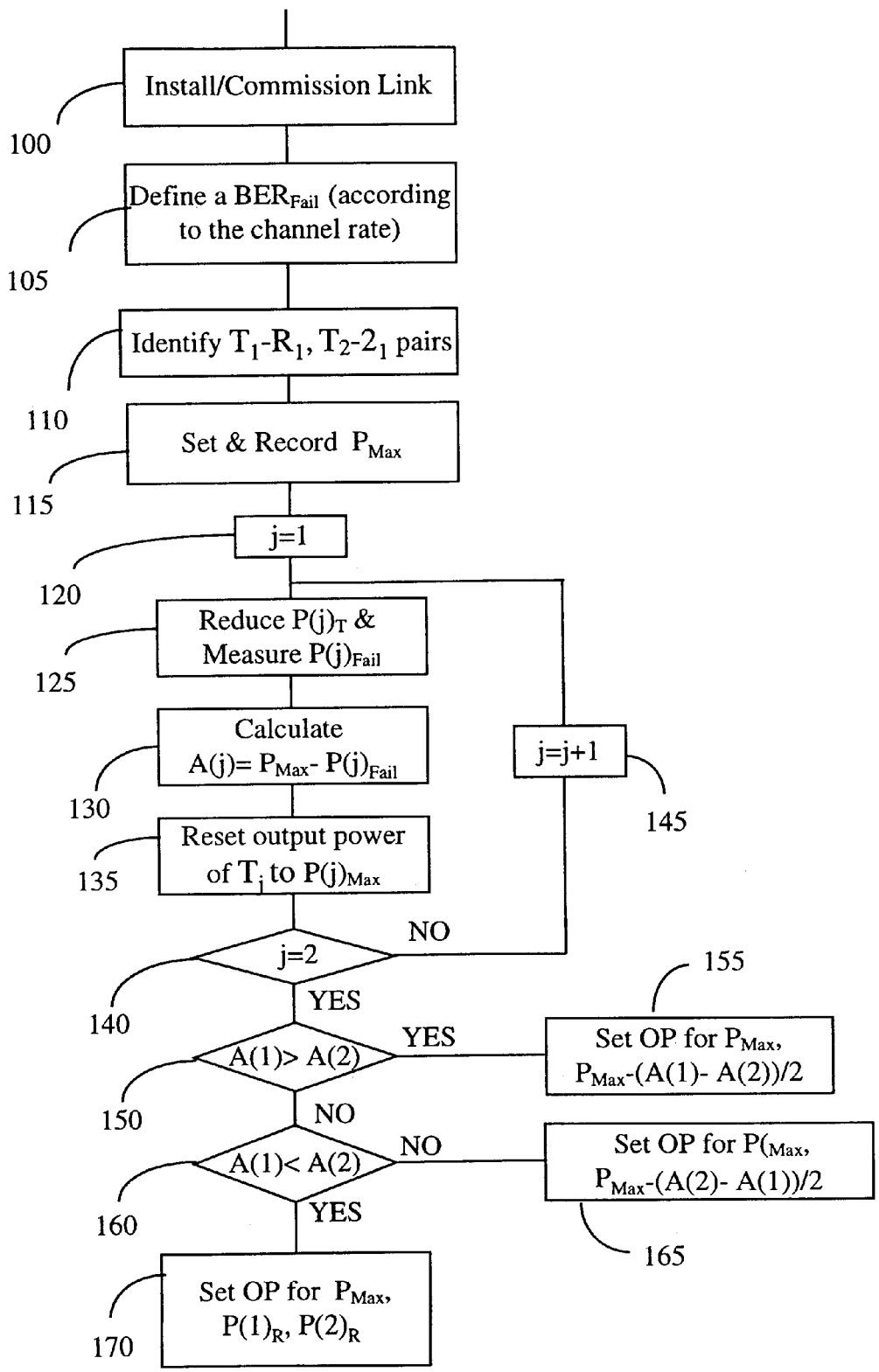
FIG. 4 is a flow-chart showing the method of the invention for equalizing the system of FIG. 3.

The method according to the invention is next described for the two-channel system of FIG. 3 with regard to the flowchart of FIG. 4.

FIG. 3 illustrates a two-channel unidirectional amplified transmission link connecting transmitters $T_1$ and $T_2$ at terminal 11, with receivers $R_1$ and $R_2$ at terminal 17; however, the invention equally applies to bi-directional systems with more than two channels.

The link includes fiber spans 10', 20', 30' and 40' connecting optical amplifiers 10, 20, 30, 40, and 50 for amplifying channels $\lambda(1)$ and $\lambda(2)$. We note in the following the optical power output by transmitter $T_1$ on channel $\lambda(1)$ with $P(1)_T$, the loss introduced by span 20' to signal $S_1$ travelling on channel $\lambda(1)$ with $L(1)_S$, the power of signal $S_1$ at the output of amplifier 20 with $P(1)_A$, and the power at the input of receiver $R_1$ with $P(1)_R$. BER(1) is the bit error rate measured after detection of the signal at the output of receiver $R_1$, while BER(2) is the bit error rate measured after detection of the signal at the output of receiver $R_2$. Individual notations are used for BER(1) and BER(2) for distinguishing the channels in the process of describing the equalization method of the invention.

Same definitions apply to elements and parameters for channel $\lambda(2)$, or to any other channels that a transmission system under consideration may have.

In this specification, the received power margin of a channel is the amount that the received power can be reduced until the channel fails. The transmitter power margin of a channel is the amount that the transmitter power of a channel can be reduced until the channel fails. Similarly, the amplifier power margin of a channel is the amount that the output power $P(j)_A$ of one or more of the amplifiers can be reduced until the channel fails, and the span margin of a channel is the amount of loss $L(j)_S$ that can be added to one or more of the fiber spans until the channel fails, where (j) is the range of the channel between 1 and J, the total number of channels of the WDM system.

In the embodiment of FIG. 3, the equalization is performed manually at the transmitter site 11, based on a the BER curves prepared at installation, that predict how BER varies with the power input to the link. Alternatively, the actual readings of the BER(1) and BER(2) may be used, if the network is provided with a communication channel between the transmitter site 11 and the receiver site 17.

For example, the communication between the sites may take place along a bidirectional service channel illustrated in FIG. 3 by dotted line 22. A network monitoring unit may be connected over this channel for processing the information received from terminals 11 and 17, or for any other network elements of interest in the respective link.

FIG. 4 shows a flow-chart of the method of the invention for equalizing the system of FIG. 3. First, the link is installed/commissioned to work in the current operating point, without equalization, as shown in step 100. We note the range of a channel with (j) and the total number of channels with (J). In the example of FIG. 3 J=2 and (j) takes the values 1 and 2.

In step 105, a BER failing point is defined for all channels, corresponding to a BER that is denoted with $BER_{Fail}$. As indicated above, for example, the failing point of a channel is defined by a range of BER values or a fixed value of at about $BER_{Fail}=10^{-9}$. The chosen failure point depends on the bit rate and system requirements.

The transmitter-receiver pairs are identified, from the transmitter site, namely it is identified which transmitter and receiver communicate along a channel; $T_1$ and $R_1$ operate on the frequency of channel $\lambda(1)$, and $T_2$ and $R_2$ operate on the frequency of channel $\lambda(2)$. This is illustrated in step 110.

Then, the output power of both transmitters is set at maximum, $P_{Max}$; which is the maximum power of the weakest channel. The maximum value $P_{Max}$ or $P_{Max}$ is measured and recorded, as shown in step 115.

With one channel at the maximum power, e.g. with transmitter $T_2$ transmitting at $P_{Max}$, the power of the first transmitter $T_1$ is lowered until the first channel fails, as shown in step 125 for j=1. This measurement takes place under operating conditions of the link, and as such it accounts for the rate of transmission and other parameters of the respective channel. The value of the power for which the channel failed is denoted with $P(1)_{Fail}$.

An added attenuation A(1) is determined in terms of the power level in step 130. A(1) is calculated as:

$$A(1)=P_{Max}-P(1)_{Fail} \tag{1}$$

Then, in step 135, the power of $T_1$ is increased back to $P_{Max}$.

This measurement is repeated for $T_2$ in steps 125–145. Again, $P(T_2)$ is reduced until $BER(2)_{Fail}$ is obtained at the receiver $R_2$. An added attenuation A(2) is determined from the measured $P(2)_{Fail}$ and $P_{Max}$ according to the relation:

$$A(2)=P_{Max}-P(2)_{Fail} \tag{2}$$

and the power of $T_2$ is increased back to $P_{Max}$ in step 135. If the system has more than two channels, i.e. j>2, steps 125–145 are repeated for each channel (j) and the respective attenuation is determined and recorded.

Attenuations A(1) and A(2) are used to determine the optimum transmitter bias level of all channels, i.e. to select the operation point of the transmitter, shown in steps 150 to 170 for the example of FIG. 3. A(1), in dB, is the added attenuation required to fail channel $\lambda(1)$, and $\lambda(2)$, in dB, is the added attenuation to fail channel $\lambda(2)$. The stronger channel can now be identified, as shown in steps 150 and 160 to determine the required bias for the transmitters. The power of the transmitter of the weak channel is then set to the maximum, and the power in the stronger channel is adjusted so that the difference between the output powers of the two transmitters equals the required power difference.

More precisely, the system should be biased as follows:

If A(1)>A(2), then the channel $\lambda(1)$ should be attenuated by:

$$(A(1)-A(2))/2 \text{ (in dB)} \tag{3}$$

and the channel $\lambda(2)$ set at full power, as shown in steps 150 and 155.

If A(1)<A(2), then the channel $\lambda(1)$ should be set at full power and the channel $\lambda(2)$ should be attenuated by:

$$(A(2)-A(1))/2 \text{ (in dB)}, \tag{4}$$

as shown at 160 and 165. For example, if channel $\lambda(1)$ requires 10 dB attenuation to fail, and channel $\lambda(2)$ requires 6 dB attenuation to fail, then 2 dB attenuation on channel $\lambda(1)$ should be used during operation.

Step 170 accounts for the case when the two attenuations are equal.

Figure 5:
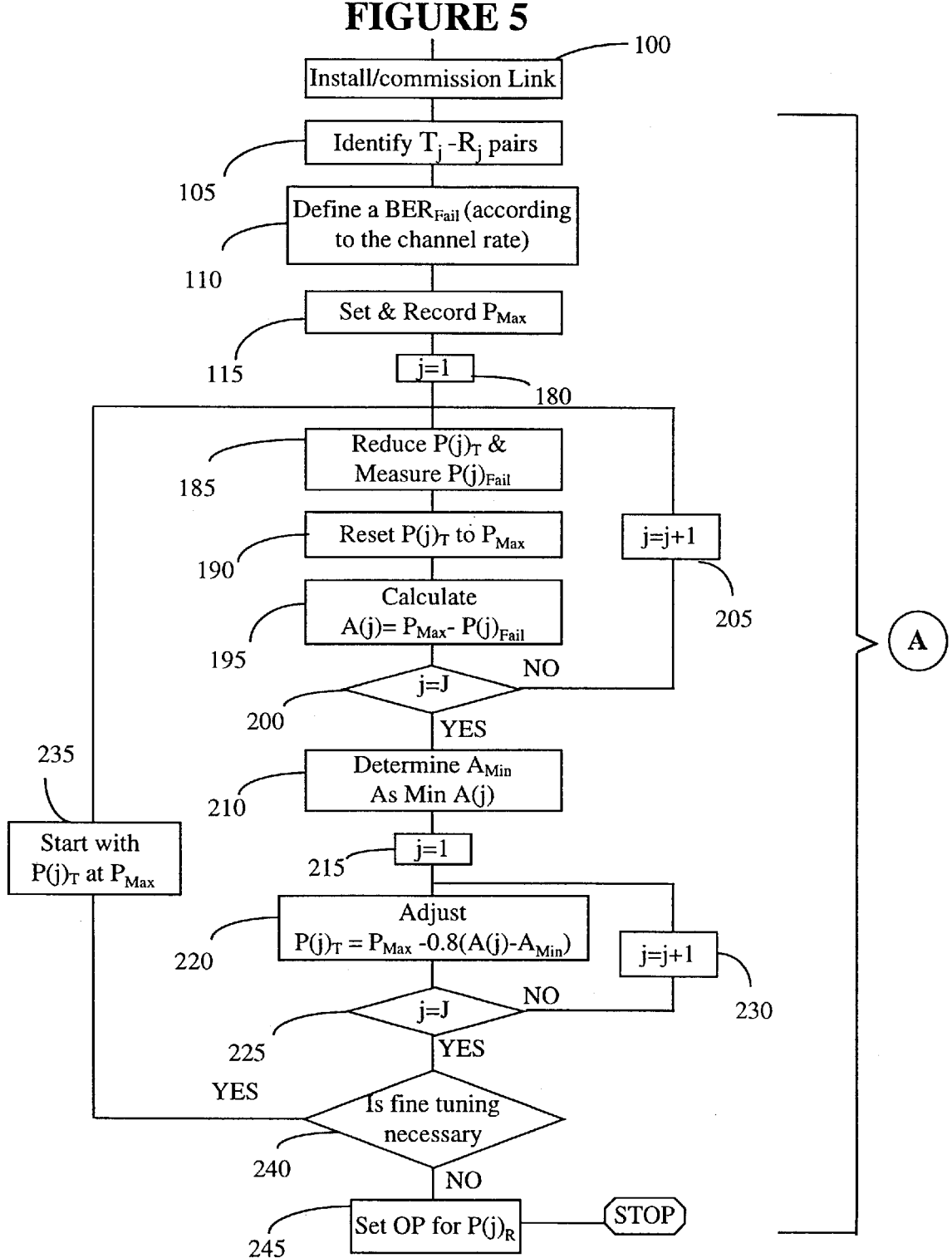
FIG. 5 is a flow-chart showing another method for equalizing a multi-channel WDM system.
Figure 7:
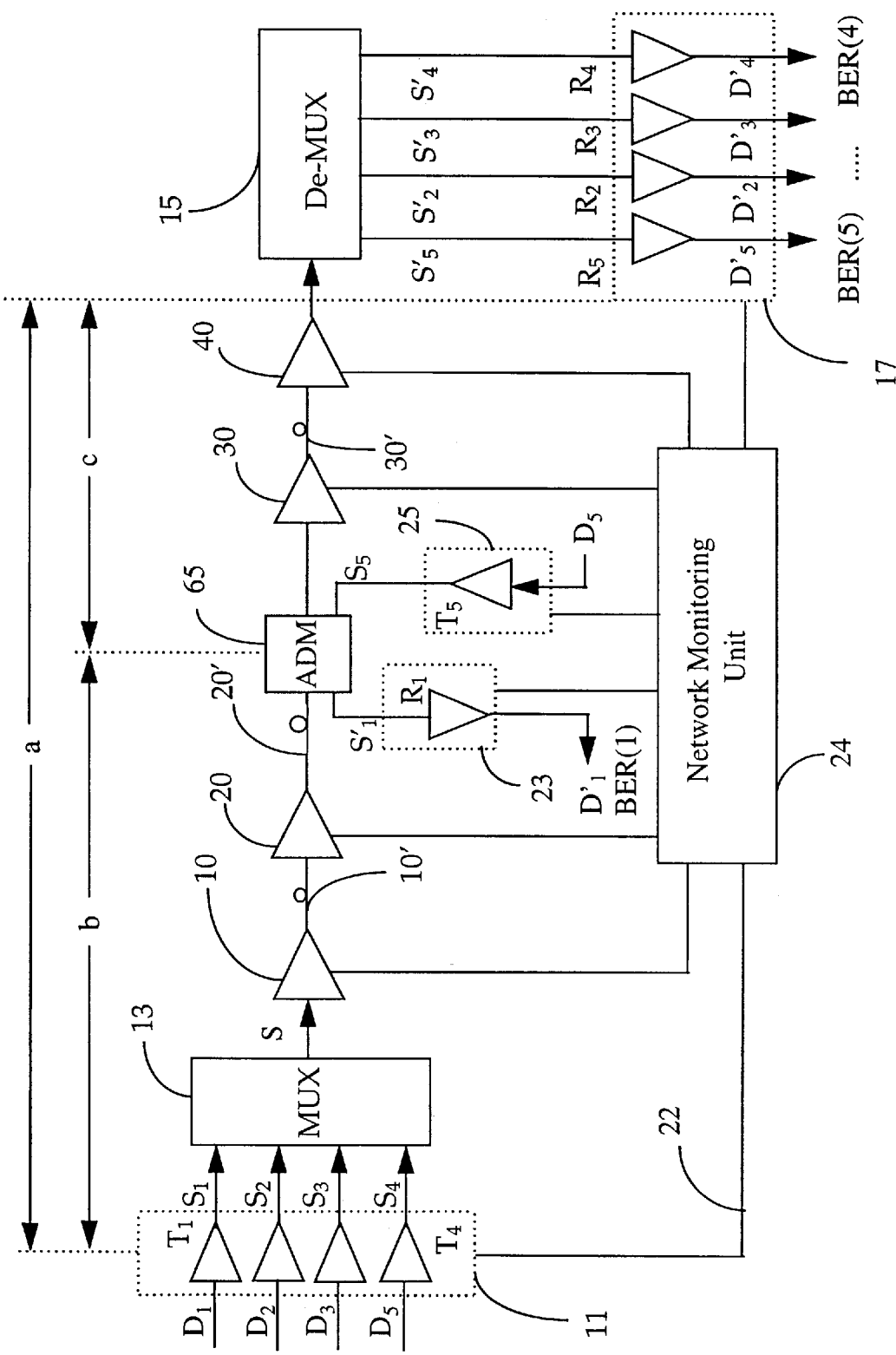
FIG. 7 shows a WDM system with multiple terminal sites, where equalization of the channels is performed automatically.

FIG. 5 shows an alternative equalization method based on BER for a WDM system with J (J>2) optical channels propagating in the same direction, called herein the extrapolation method, as shown for example in FIG. 7 for four channels. The required output power for a channel (j), where j∈[1, J] could be determined using the relation:

$$P(j)_T=P_{Max}-\eta(A(j)-A_{Min}) \tag{5}$$

where the distance to failure A(j) of channel (j) is calculated as in Eq(1) and Eq(2), namely $A(j)=P_{Max}-P(j)_{Fail}$, where $P_{Max}$ is the maximum output power of transmitter $T_j$, $P(j)_{Fail}$ is the transmit output power of channel (j) at which the BER reaches the predefined $BER_{Fail}$ value. $A_{Min}$ in Eq. (5) is the minimum of A(j), and η is a coefficient depending on the number of channels. For example, the optimal value for this coefficient, for a 3 or 4λ system is η=0.8.

To implement this extrapolation method, the following steps are performed, as illustrated in FIG. 5.

As in the case shown in FIG. 4, the transmission link is installed/commissioned in step 100, $T_j-R_j$ pairs are identified in step 105, and the BER for each channel in the failure point is identified, which depends on the receiver. For example, different values are provided for the receiver of a OC-192 channel than for a receiver for a OC-48 channel. This is shown in step 110.

Thereafter, all transmitters are set to a maximum output power in step 115.

Next, the distance to failure in terms of attenuation for all (J) channels is determined in steps 180–205. When the system is provided with an external monitoring network, such as is service channel 22 and monitoring unit 24, the power monitors screens of receivers $R_j$ may be brought-up at terminal 11 site for reading the power values for all channels. The output power is reduced for the first transmitter until this channel fails, i.e. a $BER_{Fail}$ of $10^{-8}-10^{-9}$ is reached at the output of $R_1$. It is to be noted that the value of $BER_{Fail}$ has been selected in the above range as an example only, other targets may be used in a similar way. This is illustrated by step 185 for channel $\lambda(j)$. After the $P(j)_{Fail}$ is recorded, the output power of $T_j$ is reset to $P_{Max}$, as shown in step 190.

Monitoring unit 24 determines the distance to failure A(j) for channel (1) according to Eq(1) in step 195. Steps 185 to 195 are repeated for all (J) channels, as shown by 200 and 205.

When all distances to failure are available, the minimum A(j) is determined in step 210 and denoted with $A_{Min}$. Equalization of channels is next performed by adjusting the output power of all transmitters according to Eq. (5), as shown by step 220. Step 220 is repeated for all J channels, as shown at 225 and 230. In steps 240 decision is made if the channels should be further equalized (fine tuning) or not. Thus, for fine tuning, steps 185 to 240 are repeated with the powers found in step 220, as indicated in box 235.

Figure 6:
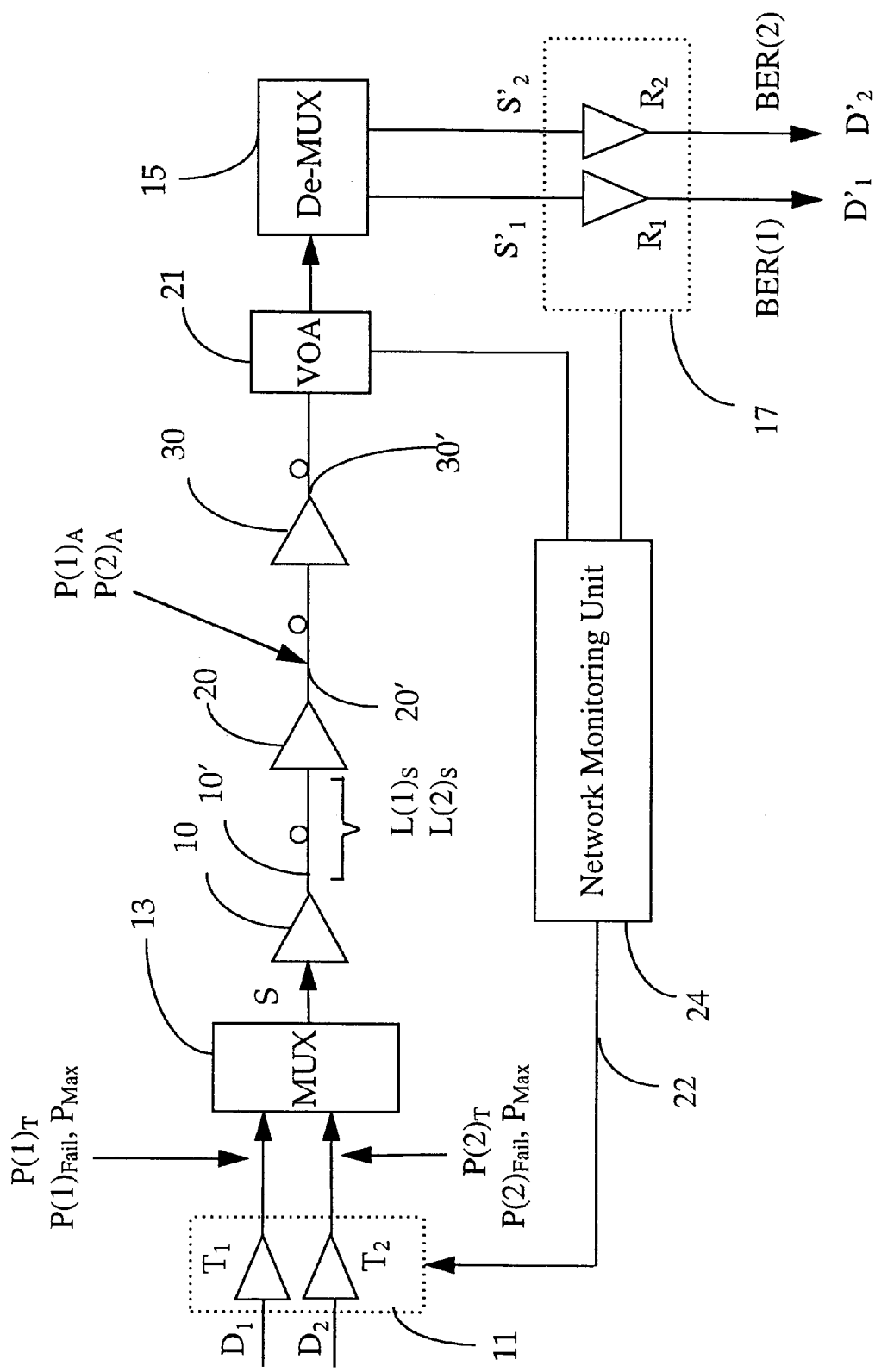
FIG. 6 is a block diagram of an amplified two-channel system for determining the various margins according to the invention.

FIG. 6 illustrates an example of a network provided with an external monitoring network. In the example of FIG. 6, the external monitoring network comprises a service channel 22 and a monitoring unit 24, but the external monitoring may be effected in any other way. It is also to be understood that service channel 22 can be carried through the same fiber with the user traffic, or may be a separate communication network.

The equalization for the link between transmitter terminal 11 and receiver terminal 17 is performed automatically, in that the BER measured in the failing point of the channels and the powers of the transmitters are processed by monitoring unit 24 which calculates the attenuations A(1) or A(2) and adjusts the operating point of transmitters $T_1$ and $T_2$ accordingly. The service channel 22 conveys the measured BERs to unit 24 processor that calculates the power margins and performs the required adjustments of the power for each transmitter.

In an optically amplified system as shown in FIG. 6, the power margin in a point of interest may be measured using attenuators. As well, attenuators may be used for the case when the WDM system is equipped with fixed power transmitters.

For measuring the received power margin of the entire transmission link between terminals 11 and 17, a variable-optical-attenuator (VOA) 21 is connected just before demultiplexer 15. The attenuation of the VOA 21 for channel $\lambda(1)$ is increased until the BER(1) reaches the failure condition denoted with $BER_{Fail}$. The transmitter powers are adjusted until all channels fail at the same VOA attenuation, in which case all channels will have the same power margin.

Similarly, amplifier power margin can be measured by monitoring the BER at the output of a channel as the power of one or more amplifiers is reduced. The span margin can be measured by inserting a VOA into one or more spans.

The transmitter power margin can be measured by setting all transmit output powers at maximum, then reducing the powers, one channel at a time until that channel fails. The measured distance to failure, in terms of attenuation or power level, is then used to select the biasing levels for the transmitters.

The various margins are very useful in that they give the network owner a good measure of how much more equipment/fiber can be added to the link, or how the link may be reconfigured or upgraded. The presence of the external monitoring network simplifies the adjustment, in that all power values measured for the system and the corresponding BERs may be collected in the point of interest, and also, the adjustment of any network element may be effected remotely by the monitoring unit 24 based on the data collected from the elements of the link.

The transmitter power adjustment may be done manually or automatically, using a model that predicts how the BER varies with the input power, while incorporating other relevant system constraints. With a control feedback loop through monitoring unit 24, the transmitter power margins of the co-propagating channels can be equalized automatically, as the measurements can be effected by the power monitor.

In case of more channels, the BER of all the channels can be equalized by adjusting the transmitted powers of the various channels taking into account the transmitter dynamic ranges, the system input power dynamic range, and the measured margins to failure. The margins for the new values of input powers can be re-measured and the input powers can be iteratively adjusted to obtain a more accurate bias point. For most cases, adequate equalization can be obtained by going through only one or two iterations.

FIG. 7 depicts a schematic diagram of a typical WDM transmission link with multiple terminals. An Add/Drop multiplexer (ADM) 65 drops signal $S_1'$ travelling on channel $\lambda(1)$ from the multi-channel signal S. Receiver $R_1$ is located at the site of ADM 65 in this example. A fifth signal, $S_5$, which has the same band as signal $S_1$, is added on channel $\lambda_1$ to multi-channel signal S, and transmitted from ADM 65 to terminal 17 where it is detected by a receiver $R_5$.

Equalization of a network as shown in FIG. 7 or a network with any number of channels to be dropped/added at the ADM site may be performed using the principle illustrated in FIG. 5 and disclosed in the accompanying text.

A first way of equalizing performance of this network is shown in FIG. 8A. After the network is installed/commissioned, as shown in step 100, all (K) channels to be dropped at the ADM 65 site, here designated with (k), are connected through the ADM coupler so as to by-pass the ADM. More precisely, the drop port and the add port of the coupler are connected using a short patch-cord for each of the channels to be dropped, so that the channels travel all the way from terminal 11 to terminal 17. In the example of FIG. 7, channel S1 dropped at ADM 65 is rather connected to by-pass the ADM to arrive at terminal 17. This is shown in step 300.

Steps 302 and 305 indicate that the procedure marked in FIG. 5 with A, performed for equalizing the performance of J end-to-end channels (four in this example) are now carried for signals $S_1$–$S_4$ transmitted by terminal 11.

Next, ADM 65 is reconnected so that the K drop channels end at that site, as shown in step 310. In the example of FIG. 7, channel $S_1$ is reconnected to the drop port of ADM 65.

The power of each drop channels (k) is measured in step 320, and the channel is added back at the ADM site, with the transmit power equal to the received power, step 325. Steps 320 and 325 are repeated for all dropped channels, as shown at 315–335. In the present case, the power of added signal $S_5$ transmitted over channel $\lambda_1$ is adjusted to be equal to the power of signal $S_1'$ measured at the ADM site.

FIG. 8B shows another variant of how the system of FIG. 7 can be equalized. In this variant, optical paths (a), (b) and (c) shown on this figure are considered namely: path (a), includes M channels directly connecting terminal 11 with terminal 17, passing through ADM 65; path (b) includes K channels connecting terminal 11 with ADM 65, and dropped at the ADM site; and path (c) includes K channels added at ADM 65, between ADM site and terminal 17. In this example, the number of channels dropped and added as equal.

This method employs again the procedure in FIG. 5 for optical path (a) and (b) with the channels dropped/added at the ADM site. FIG. 8B shows step 100, whereby the link between terminals 11 and 17 is installed/commissioned, followed by equalization of all M direct (end-to-end) channels on link (a), as shown in steps 400 and 405. In steps 410 and 415 channels K dropped at ADM 65 are equalized using the same procedure as in FIG. 5. Then, the power of each of the K received (dropped) channels is measured at the ADM site, as shown in step 425.

Finally, at the ADM site, the transmit power of each added channel $P(k)_a$ is set equal to the power of the corresponding dropped channel $P(k)_d$, shown in step 425.

Figure 8C:
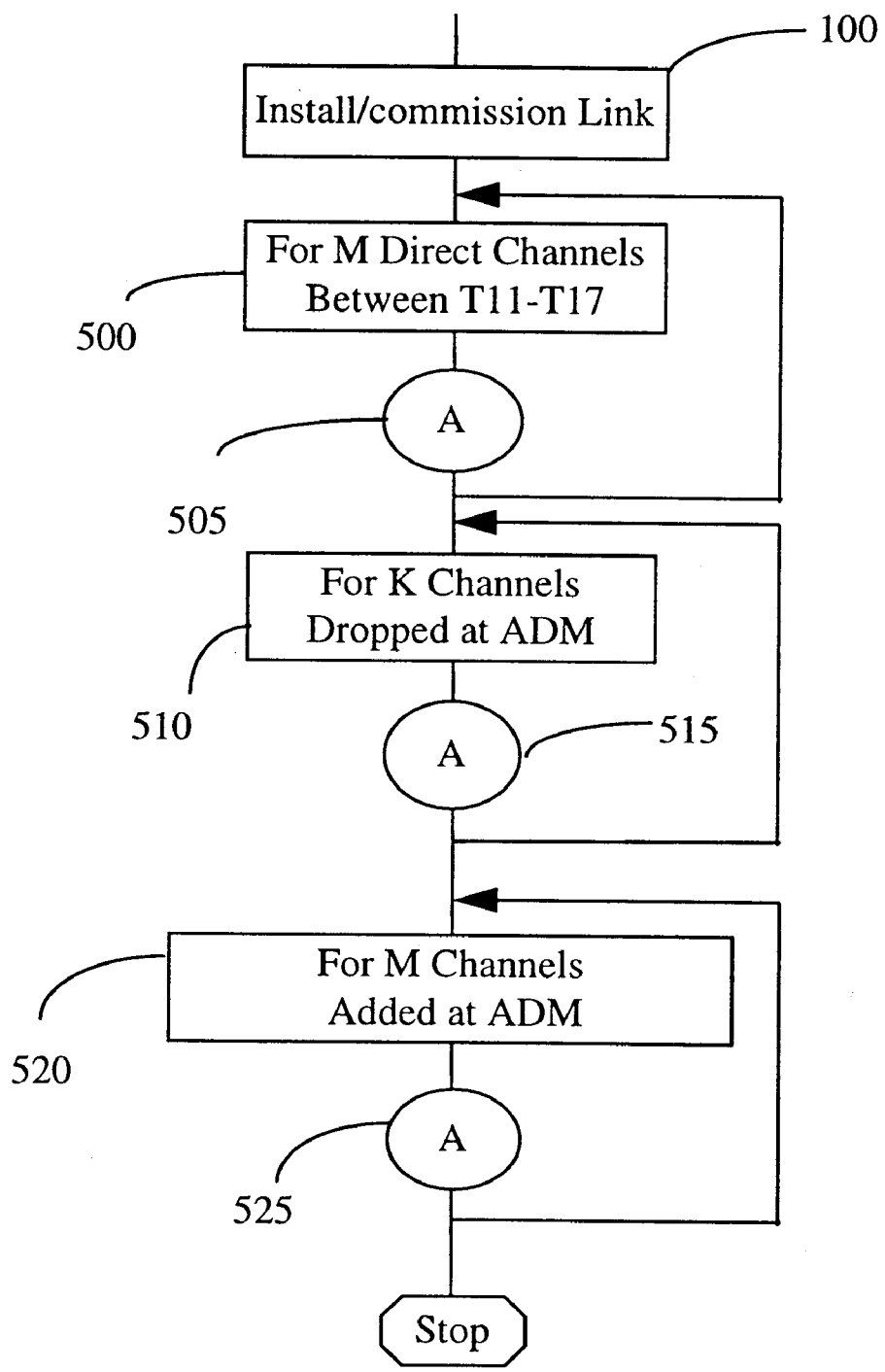

Another method of equalization of performance for the link of FIG. 7 is disclosed next in connection with FIG. 8C. The procedure in FIG. 5 is applied to optical paths (a), for all M direct channels between terminals 11 and 17, in steps 500–505, then to path (b) including all K dropped channels, in steps 510–515 and then to path (c) including all K added channels, in steps 520–525, by considering the channels added back to the link through the ADM coupler as extra channels when using Eq(5).

To equalize a WDM network with multiple transmitter and receiver terminals, external monitoring network iterates the steps above until the powers of all channels converge to within predetermined guidelines. Since one or more channels may be operating error-free before equalization, the performance of these channels is degraded during equalization to measure the received power margin, transmitted power margin, amplifier power margin, or span margin.

The method may be used for network with channels of different bit rates. Monitoring unit 24 equalizes the BER at the receivers by adjusting the transmitter powers, either by reducing the power of the strongest transmitter, or by increasing the power of the weaker transmitters.

It is recommendable to carry out the equalization procedure when a new multi-channel system is initially set up or upgraded to more channels. The method ensures that channels within each transmission band are matched in terms of BER performance. This procedure is particularly suited for transmitters having adjustable output power, but can be also used for fixed power transmitters, by using VOAs to adjust the transmitter powers.

For a multi-channel system, it is possible that one or more channels operate before equalization at a BER higher than the specified $BER_{Fail}$. This happens because the ripple and gain tilt introduced by optical amplifiers in the path of the optical signal vary with the wavelength. There are two ways to approach this problem. A first solution is to redefine the failure point and continue with the method described above. As indicated above, failure point is a user pre-defined point, so that a higher BER value may be selected for defining the failing point, to operate all channels above it. Another solution is to attenuate the transmitter output power of all other channels, which are initially running at a BER lower than the failure point. In this way, the performance of the failed channel(s) is brought back in the vicinity of the failure point. The output power of these transmitters is then used as the initial setting.

Another way to define failure of a channel is to use a loss-of signal (LOS) or signal-degradation (SD) alarms at the receiver. This alternative method has the advantage that the LOS or SD alarm are raised automatically and immediately, so it gives a faster measure of the channel failure point. On the other hand, this second alternative has some drawbacks, such as: (1) the equalization would be performed with the channels functioning away from the operating point so that the results are less accurate, (2) it requires a larger transmitter power dynamic range to reach the failure point, and (3) the LOS or SD alarm are not as accurate a measure of system performance as is the BER.

While the invention has been described with reference to particular example embodiments, further modifications and improvements which will occur to those skilled in the art, may be made within the purview of the appended claims, without departing from the scope of the invention in its broader aspect.

We claim:

1. A method for equalizing a plurality of (J) signals S(j), travelling on a WDM link between a first terminal and a second terminal comprising the steps of:

for each channel λ(j) of said WDM link, measuring a distance to failure A(j) for a parameter P(j) of a signal S(j) travelling on said channel λ(j); and adjusting said parameter P(j) at said first terminal for obtaining equal distances to failure for all J channels.

2. A method as claimed in claim 1, wherein said step of measuring comprises:

inserting an attenuator in a point of interest between said first and said second terminal; and increasing the attenuation of said signal S(j) with said attenuator, until an error count indicator at said second terminal is higher than a provisioned threshold.

3. A method as claimed in claim 2, wherein said point of interest is the input of said second terminal and said parameter is the power of said S(j) so as to equalize the power of all said signals S(j) at said second terminal.

4. A method as claimed in claim 1, wherein said point of interest is the output of an optical amplifier connected in said WDM link, and said parameter is the gain introduced by said amplifier on said signals S(j) at said second terminal.

5. A method as claimed in claim 1, wherein said point of interest is a span of said WDM link and said parameter is the span loss for said signals S(j) measured at said second terminal.

* * * * *